US010552778B2

(12) United States Patent
Charpentier et al.

(10) Patent No.: US 10,552,778 B2
(45) Date of Patent: Feb. 4, 2020

(54) POINT-OF-SALE (POS) TERMINAL ASSISTANCE (71) Applicant: NCR Corporation, Duluth, GA (US)

(72) Inventors: Peter R. Charpentier, Suwanee, GA (US); Jason Rambler, Decatur, GA (US)

(73) Assignee: NCR Corporation, Atlanta, GA (US)

(*) Notice: Subject to any disclaimer, the term of this patent is extended or adjusted under 35 U.S.C. 154(b) by 672 days.

(21) Appl. No.: 14/813,554

(22) Filed: Jul. 30, 2015

(65) Prior Publication Data
US 2017/0032304 A1 Feb. 2, 2017

(51) Int. Cl.
G06Q 10/06 (2012.01)
G07G 1/12 (2006.01)
G07G 1/00 (2006.01)
G06Q 20/20 (2012.01)
G06Q 20/18 (2012.01)

(52) U.S. Cl.
CPC ....... *G06Q 10/06316* (2013.01); *G06Q 20/18* (2013.01); *G06Q 20/209* (2013.01); *G07G 1/0036* (2013.01); *G07G 1/12* (2013.01)

(58) Field of Classification Search
None
See application file for complete search history.

(56) References Cited

U.S. PATENT DOCUMENTS 5,115,888 A * 5/1992 Schneider ............... A47F 9/048 186/61
5,426,282 A * 6/1995 Humble .................. A47F 9/047 186/61
5,494,136 A * 2/1996 Humble .................. A47F 9/047 186/61
5,774,591 A * 6/1998 Black ................... G06K 9/00248 382/118
5,802,220 A * 9/1998 Black ................... G06K 9/00248 382/100
5,883,968 A * 3/1999 Welch ..................... A47F 9/045 382/100

(Continued)

FOREIGN PATENT DOCUMENTS

EP 2704052 A1 * 3/2014
WO WO-9504491 A1 * 2/1995 ............ A47F 9/047
WO WO-2014105892 A2 * 7/2014 ............ G06Q 20/12

OTHER PUBLICATIONS

Senior, Andrew W., et al. "Video analytics for retail." 2007 IEEE Conference on Advanced Video and Signal Based Surveillance. IEEE, 2007. (Year: 2007).*

(Continued)

*Primary Examiner* — Thomas L Mansfield
*Assistant Examiner* — Derick J Holzmacher
(74) *Attorney, Agent, or Firm* — Schwegman, Lundberg & Woessner (57) ABSTRACT An imaging device captures movements and/or non-movements of an operator of a Point-Of-Sale (POS) terminal during an ongoing transaction at the POS terminal. Events from the POS terminal are combined with the captured movements and/or non-movements to determine or predict what steps the operator should next do in furtherance of the ongoing transaction. Those steps are automatically communicated to the operator of the POS terminal for the transaction to progress.

18 Claims, 4 Drawing Sheets (56) References Cited

U.S. PATENT DOCUMENTS

| | | | | |
|---|---|---|---|---|
| 6,236,736 B1* | 5/2001 | Crabtree | G01S 3/7865 | 235/383 |
| 6,263,088 B1* | 7/2001 | Crabtree | G01S 3/7865 | 348/169 |
| 6,295,367 B1* | 9/2001 | Crabtree | G01S 3/7865 | 382/103 |
| 6,726,094 B1* | 4/2004 | Rantze | G06Q 20/20 | 235/379 |
| 6,950,534 B2* | 9/2005 | Cohen | G06F 3/017 | 382/103 |
| 8,429,016 B2* | 4/2013 | Bobbitt | G06Q 40/00 | 705/16 |
| 2006/0169764 A1* | 8/2006 | Ross | G07F 19/20 | 235/375 |
| 2007/0058040 A1* | 3/2007 | Zhang | G06K 9/00771 | 348/150 |
| 2007/0272734 A1* | 11/2007 | Lipton | G06Q 20/20 | 235/375 |
| 2008/0018738 A1* | 1/2008 | Lipton | G06K 9/00771 | 348/143 |
| 2008/0089587 A1* | 4/2008 | Kim | G06F 3/017 | 382/190 |
| 2011/0063108 A1* | 3/2011 | Aonuma | G06Q 20/4016 | 340/540 |
| 2011/0087535 A1* | 4/2011 | Yoshizawa | G06Q 20/20 | 705/14.26 |
| 2011/0093344 A1* | 4/2011 | Burke | G06Q 20/20 | 705/14.65 |
| 2012/0224040 A1* | 9/2012 | Wang | G06K 7/10881 | 348/77 |
| 2013/0201135 A1* | 8/2013 | Ludwig | G10H 1/00 | 345/173 |
| 2013/0256403 A1* | 10/2013 | MacKinnon Keith | G06K 5/00 | 235/375 |
| 2013/0304595 A1* | 11/2013 | Goncalves | G06Q 20/203 | 705/22 |
| 2014/0040014 A1* | 2/2014 | Anand | G06Q 30/06 | 705/14.45 |
| 2014/0052554 A1* | 2/2014 | Abraham | G07G 1/14 | 705/21 |
| 2014/0064570 A1* | 3/2014 | Miyakoshi | G06K 9/2018 | 382/110 |
| 2014/0067574 A1* | 3/2014 | Miyakoshi | G06Q 20/208 | 705/23 |
| 2014/0067679 A1* | 3/2014 | O'Reilly | G06Q 20/40145 | 705/44 |
| 2014/0157209 A1* | 6/2014 | Dalal | G06F 3/017 | 715/863 |
| 2014/0160293 A1* | 6/2014 | Ristivojevic | H04N 7/18 | 348/150 |
| 2014/0222545 A1* | 8/2014 | Hajji | G06Q 20/20 | 705/14.38 |
| 2014/0310764 A1* | 10/2014 | Tippett | G06F 21/31 | 726/1 |
| 2014/0362223 A1* | 12/2014 | LaCroix | H04N 7/183 | 348/150 |
| 2014/0365273 A1* | 12/2014 | Hurewitz | G06Q 30/0643 | 705/7.29 |
| 2015/0193115 A1* | 7/2015 | Chirakan | G06F 3/0488 | 715/810 |
| 2016/0078290 A1* | 3/2016 | Rambler | G07G 1/00 | 382/103 |
| 2016/0117757 A1* | 4/2016 | Thomas | G06Q 30/0639 | 705/14.66 |

OTHER PUBLICATIONS

Peleshko, Dmytro, et al. "Design and implementation of visitors queue density analysis and registration method for retail videosurveillance purposes." 2016 IEEE First International Conference on Data Stream Mining & Processing (DSMP). IEEE, 2016. (Year: 2016).*

Venetianer, Péter L., et al. "Video verification of point of sale transactions." 2007 IEEE Conference on Advanced Video and Signal Based Surveillance. IEEE, 2007. (Year: 2007).*

* cited by examiner

FIG. 4 ical as images using the image capture 132. The motion
POINT-OF-SALE (POS) TERMINAL ASSISTANCE

BACKGROUND

Point-Of-Sale (POS) terminal devices often include a variety of integrated devices, such as scanners, scales, integrated scanners with scales, card readers with on-screen signature capabilities, and the like.

One type of POS terminal is a customer-operated Self-Service Terminal (SST). A customer that operates a SST can often get confused and not understand what is the next steps being required during a transaction with the SST. Many, SSTs will provide onscreen responses in an attempt to assist the customer but such responses are limited and often not even applicable to the customer's ongoing problem with the transaction.

For example, a customer buying produce that needs placed on a scale my attempt to scan the produce instead of placing the produce on the scale. As another example, a customer may successfully scan an item at the SST but is unsure where to place the scanned item. In yet another case, a customer may have difficulty in scanning a coupon that the customer wants to have applied to the transaction (such as unsure when to scan during the transaction, etc.).

Many times what occurs in these situations is the SST locks and says a clerk is in route for assisting the customer. This is time consuming, utilizes valuable human resources of the retailer, etc.

Another type of POS terminal is a cashier-operated terminal. Cashiers can encounter issues where they need assistance from supervisors as well. This is particularly true of newer cashiers that have not been on the job for any substantial period of time. When these cashiers need assistance, supervisors (who may be busy or unavailable for an extended period of time) are dispatched to assist the cashiers needing assistance. This causes customer frustration as the queue length and wait times increase for customers who are in the queue where a cashier needs assistance.

Therefore, what is needed is improved and customized assistance for operators of POS terminals during a transaction.

SUMMARY

In various embodiments, methods and an image device for automated POS terminal assistance are provided.

According to an embodiment, a method for automated POS terminal assistance is provided. Specifically, images of an operator of a Point-Of-Sale (POS) terminal are captured and an event raised from the POS terminal is obtained. Next, a next step to be performed by the operator on the POS terminal, based on evaluation of the images and the event, is automatically and electronically communicated to the operator at the POS terminal.

DETAILED DESCRIPTION

Figure 1:
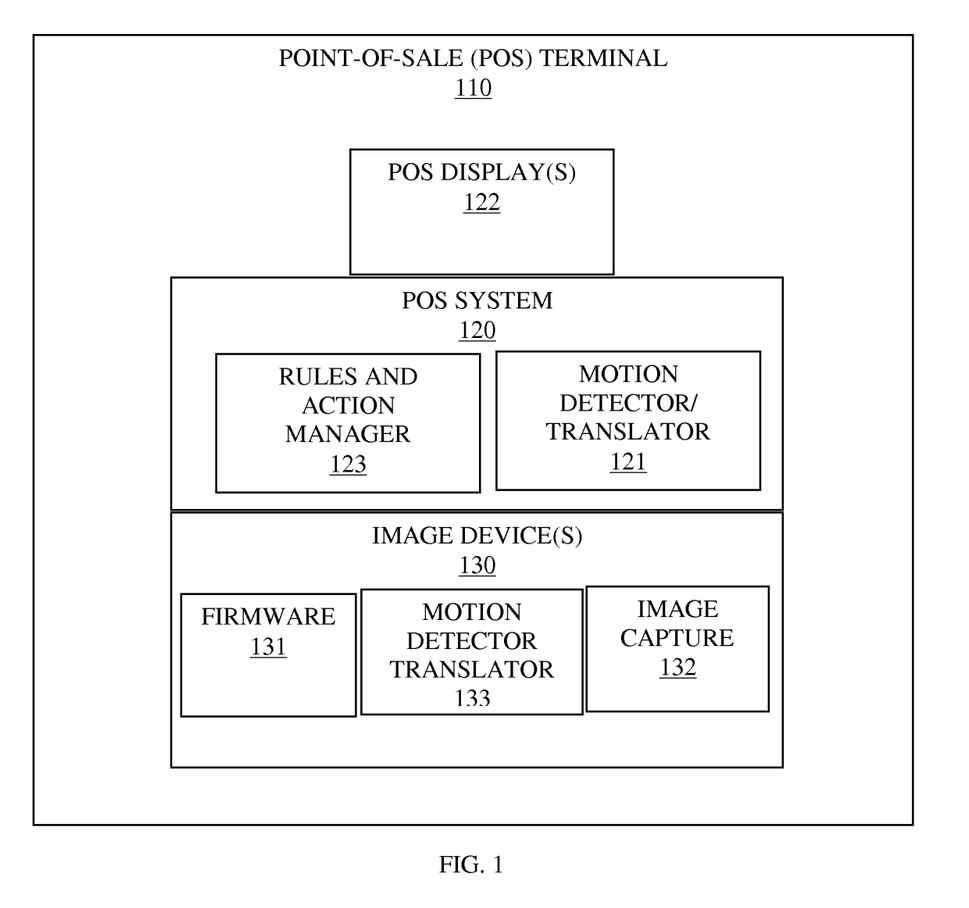
FIG. 1 is a diagram illustrating components of a POS terminal having one or more imaging devices that provide automated operator assistance, according to an example embodiment.

FIG. 1 is a diagram illustrating components of a POS terminal having one or more imaging devices that provide automated operator assistance, according to an example embodiment. It is to be noted that the POS terminal 110 is shown schematically in greatly simplified form, with only those components relevant to understanding of the embodiments being illustrated. The same situation may be true for the other various components of the POS terminal 110.

Furthermore, the various components (that are identified in the FIG. 1) are illustrated and the arrangement of the components is presented for purposes of illustration only. It is to be noted that other arrangements with more or less components are possible without departing from the teachings of automated POS terminal assistance, presented herein and below.

Moreover, the methods and imaging device(s) presented herein and below (for automated POS terminal assistance) may include all or some combination of the components shown with the FIG. 1. The methods are programmed as executable instructions in memory and/or non-transitory computer-readable storage media and executed on one or more hardware processors associated with the components/devices.

Specifically, the FIG. 1 permits one or more imaging device(s) 130 to capture and detect physical movements of an operator (such as hand gestures, body placement, body movement, facial expressions, etc.) operating the POS terminal 110. The physical movements are captured electronically as images using the image capture 132. The motion detector/translator 121 and/or 133 translates or converts the images into one or more images that are recognizable and processed by the firmware 131 of the image device(s) 130. The images are provided to the rules and action manager 123 for evaluating the images in view of other events provided by the POS system 120 occurring during a transaction with an operator of the POS terminal 100. The rules and action manager 123, based on the evaluation, selects one or more actions that cause automated assistance to be provided to the operator with respect to what is being expected by the POS system 120 for the ongoing transaction. In some cases, that may be instructions rendered to a screen presented on one or more of the POS displays 122. All this processing takes place without any human interaction in a completely automated fashion.

It is within this context that various embodiments of the POS terminal and its specialized and customized processing are discussed with reference to the FIG. 1.

The POS terminal 110 includes a POS system 120 and one or more image devices 130. The POS system 120 includes one or more POS displays 122, a rules and action manager 123, and, optionally, a motion detector/translator 121. The one or more image device 130 includes firmware 131, an image capture module 132, and, optionally, a motion detector/translator 133.

In an embodiment, the POS terminal 110 is a SST operated by a customer.

In an embodiment, the SST is an Automated Teller Machine (ATM).

In an embodiment, the SST is a kiosk.

In an embodiment, the POS terminal 110 is a cashier-operated terminal.

The POS system 120 is integrated into the POS terminal 110. The POS system 120 can include a variety of integrated devices and peripheral devices (not shown in the FIG. 1), such as but not limited to: a keyboard, one or more POS displays 122, a currency acceptor and dispenser, a card reader, a receipt/coupon printer, one or more image devices 130, and the like.

Moreover, the POS system 120 has one or more network connections, which can be wired and/or wireless.

Still further, the POS system 120 includes a variety of processing capabilities for conducting transactions for the purchase of goods and/or services.

In an embodiment, the POS system 120 includes a single display 122.

In an embodiment, the POS system 120 includes multiple displays 122.

In an embodiment, the POS system 120 includes at least one touchscreen display 122.

In an embodiment, the POS system 120 includes a motion detector/translator 121, which receives a series of images from the image capture module 132 of the one or more image devices 130 during a transaction with an operator of the POS terminal 110.

The motion detector/translator 121 is configured to rapidly identify different characteristics from the series of images being reported from the image capture module 132, such as: period of time during which there is little discernable movement from the operator, period of time during which there is rapid movement from the operator, facial expressions of the operator, specific body part movement (hands, head, whole body position, eyes, etc.), body placement relative to the POS terminal 110 and/or its components (such as the one or more displays 121, the one or more image devices 130, other peripherals of the POS system 120, etc.), items (goods associated with the transaction) being held by the operator, movement and/or no movement of the items with respect to a component of the POS terminal 110 (image devices 130, bagging carrousel, etc.), and other configured detected movements and/or non-movements during a configured period of time for the transaction.

In an embodiment, the motion detector/translator 121 uses a sampling of pixels in defined areas to identify features of the operator of the POS terminal 110 combined with a pixel scoring technique or template matching technique for purposes of identifying the entire body of the operator from the series of image, components of body parts of the operator from the series of images, and items being handled by the operator.

It is to be noted that other image recognition approaches can be used as well without departing from the teachings presented herein.

The motion detector/translator 121 compares each image in a predefined time-slice to one another based on a template or scoring approach to a predefined detected movement and/or non-movement.

The motion detector/translator 121 then classifies the detected movements and/or non-movements and provides to the rules and action manager 123.

The rules and action manager 123 receives as input the classified movements and/or non-movements of the operator in near real time during the transaction from the motion detector/translator 121. Additionally, the rules and action manager 123 receives electronic events occurring on the POS system 120 in real time from the POS system 120. These events can include: a state of the transaction, a selection of an option made by the operator, repeated selection of a same option made by the operator, no selection made by the operator for an elapsed period of time, failure to detect an expected next action by the operator (item placed in bagging carrousel, item scanned, item placed on integrated scale of the POS system 120, selection of item type of item placed on the integrated scale, and the like).

The rules and action manager 123 then processes the classified movements along with the events in real time to evaluate against predefined rules for purposes of determining what the operator is supposed to do next for purposes of progressing the transaction to a successful conclusion. Once the rules and action manager 123 makes a decision as to what should be done next, then the rules and action manager 123 issues instructions (as actions) to the POS system 120 to cause automated assistance to be electronically communicated to the operator during the transaction.

In an embodiment, the rules and action manager 123 processes one or more actions that displays a popup window on a screen rendered to one of the POS displays 122 that communicates what the operator is supposed to do to complete whatever action the operator needs to complete to move the transaction along.

In an embodiment, the rules and action manager 123 processes one or more actions that audibly communicates (through speakers (not shown in the FIG. 1)) verbal instructions on what the operator is to do to complete whatever action the operator needs to complete to move the transaction along.

In an embodiment, the rules and action manager 123 processes one or more actions that displays and plays on video on a screen rendered to one of the POS displays 122 that communicates (through an animation video or actor video) what the operator is supposed to do to complete whatever action the operator needs to complete to move the transaction along.

In an embodiment, the rules and action manager 123 can process actions to do one, all, or various combinations of the above-mentioned embodiments to provide automated assistance to the operator on what is to be done to move the transaction along.

The one or more image devices 130 provide the mechanism for capturing the video of the operator during the transaction as a series of time sliced images. The image device(s) 130 includes firmware 131 for capturing the images (either as video or as rapid captured images), the images are time stamped and buffered or temporarily stored by the image capture module 132 and streamed from the image capture module 132 to the motion detector/translator 121.

In an embodiment, the one or more images devices 130 include their own motion detector/translator 133. In this way, the processing described above with the motion detector/translator 121 can take place either external to the image devices 130 on the POS system 120 or can occur internal to the image devices 130 through the motion detector/translator 133. The processing of the motion detector/translator 133 is similar to what was discussed above with the motion detector/translator 121.

It is also to be noted that the rules and action manager 123 may reside and process within the image device(s) 130 (although not shown in the FIG. 1).

In an embodiment, at least one image device 130 is a barcode scanner.

In an embodiment, the scanner is an integrated scanner to the POS system 120.

In an embodiment, at least one image device 130 is a camera.

In an embodiment, the POS system 120 includes at least two image devices 130. A first image device 130 is a scanner and a second image device 130 is a camera. The two image devices 130 capture different fields of view of the operator during the transaction and each independently supply time-synched images to the motion detector/translator 121.

Example scenarios are now presented for purposes of illustrating the beneficial teachings of automated POS terminal assistance during an ongoing transaction at the POS terminal 110.

Consider a customer operating a Self-Checkout Terminal (SST and a type of POS terminal 110) where that customer is attempting during an ongoing transaction with the POS terminal 110 to buy an item that needs to be weighed to determine its price (such as produce). The motion detector/translator 121 or 133 identifies and classifies the item as produce from the series of images provided by the image capture module 132. The motion detector/translator 121 or 133 also classifies images indicating that the customer is not placing the produce on the scanner of the POS system 120. The rules and action manager 123 uses rules to identify that the produce item is moving based on the images but is not stable on a top plate of the weigh scale (based on events detected from the POS system 120 and communicated to the rules and action manager 123). The rules and action manager 123 also processes the rules to determine that the customer's hand is moving and match that to where the hand should be moving or what should be done. After a configured period of time, the rules and action manager 123 issues an action that communicates (visual and/or audible) to the customer through the POS system 120 that the customer is to place the produce on the center of the scale to complete the customer action and to move the transaction along. In this example, the rules and action manager 120 may reside and process within the image device 130, which is a scanner.

In another example scenario, a customer at a Self-Checkout terminal (SST and time of POS terminal 110) scans an item but is confused on where the item is to be placed. The image devices 130 through the image capture module 132 and motion detector/translator 133 combines with the rules and action manager 123 (which may also wholly reside within the image devices 130) to determine the customer is confused based on an expected failure of a detected event that the item is not recognized in the bagging area of the POS system 120. The rules and action manager 123 may confirm the item was properly scanned but that the customer has not taken the next needed step to place that item in the bagging area. The rules and action manager 123 then communicates through the POS system 120 to the customer that the item is to be placed in the bagging area for completion of that step in the ongoing transaction with the customer.

In yet another case, a customer is attempting to scan a coupon for a discount during the transaction or a check for payment of the transaction and automated communication is provided through the POS system 120 that guides the customer on optimal placement and movement for achieving a successful scan of the item.

It is noted that non movement would also trigger automated assistance as discussed above.

It is further noted that all the processing with the automated assistance (as also discussed above) may in some embodiments wholly reside within a scanner that is the image device 130.

Furthermore, although the example automated assistance scenarios were discussed within the context of a SST and a customer; similar automated assistance can be provided with the teachings to cashiers operating a cashier-assisted terminal.

Moreover, the rules and action manager 123 may process analytics in addition to or in place of predefined rules for determining what a next action of an operator of the POS terminal 110 is to be instructed to do for automated assistance during an ongoing transaction.

These and other embodiments are now discussed with reference to the FIGS. 2-4.

Figure 2:
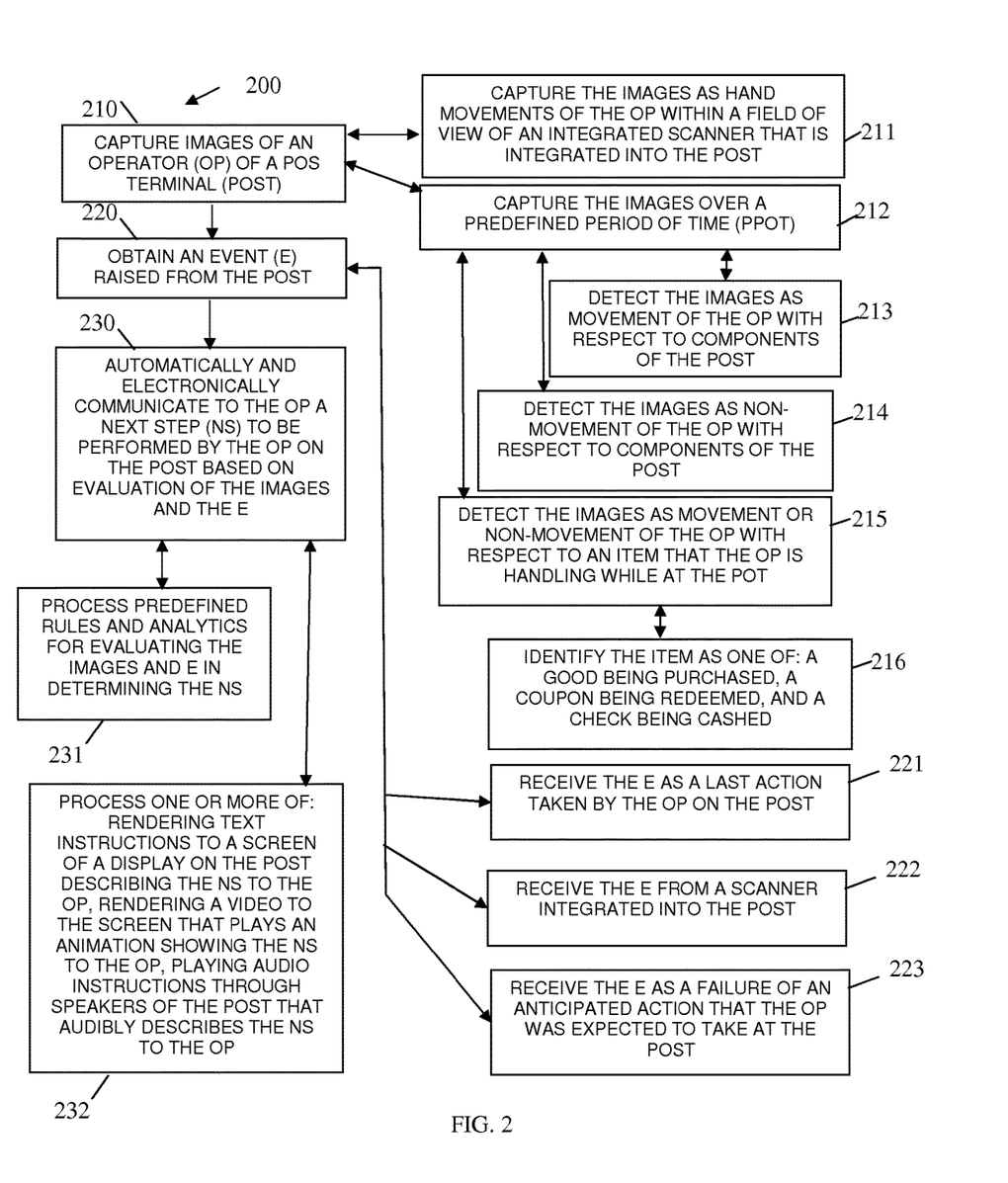
FIG. 2 is a diagram of a method for automated POS terminal assistance, according to an example embodiment.

FIG. 2 is a diagram of a method 200 for automated POS terminal assistance, according to an example embodiment. The software module(s) that implements the method 200 is referred to as an "automated assistance manager." The automated assistance manager is implemented as executable instructions programmed and residing within memory and/or a non-transitory computer-readable (processor-readable) storage medium and executed by one or more processors of a scanner. The processor(s) of the scanner that executes the automated assistance manager are specifically configured and programmed to process the automated assistance manager. The automated assistance manager may, but does not have to have, access to a network during its processing. The network can be wired, wireless, or a combination of wired and wireless.

In an embodiment, the processing of the automated assistance manager occurs within a scanner.

In an embodiment, at least some of processing for the automated assistance manager occurs within a camera.

In an embodiment, the processing of the automated assistance manager is the image capture module 132, the motion detector/translator 121, and the rules and action manager 123.

In an embodiment, the processing of the automated assistance manager is the image capture module 132, the motion detector/translator 133, and the rules and action manager 123.

In an embodiment, the processing of the automated assistance manager occurs within the POS terminal 110. In an embodiment, the POS terminal 110 is a SST. In an embodiment, the SST is an ATM. In an embodiment, the SST is a kiosk. In an embodiment, the POS terminal 110 is a cashier-assisted terminal.

At 210, the automated assistance manager captures images of an operator while at and operating a POS terminal. In an embodiment, the operator is a customer and the POS terminal is a SST. In an embodiment, the operator is a cashier and the POS terminal is a cashier-assisted terminal.

According to an embodiment, at 211, the automated assistance manager captures the images as hand movements of the operator within a field of view of an integrated scanner that is integrated into the POS terminal.

In an embodiment, at 212, the automated assistance manager captures the images over a predefined period of time.

In an embodiment of 212 and at 213, the automated assistance manager detects the images as movement with respect to components of the POS terminal. The components may include: a touchscreen display, a keyboard, a scanner, a printer, a bagging carousel, a card reader, a currency dispenser, a currency acceptor, and the like.

In an embodiment of 212 and at 214, the automated assistance manager detects the images as non-movement or no movement during the predefined period of time with respect to components of the POS terminal.

In an embodiment of 212 and at 215, the automated assistance manager detects the images as movement or non-movement with respect to an item that the operator is handling while at the POS terminal.

In an embodiment of 215 and at 216, the automated assistance manager identifies the items as one of: 1) a good being purchased by the operator at the POS terminal, 2) a coupon that the operator is attempting to redeem at the POS terminal during a transaction with the POS terminal, and 3) a check that the operator is attempting to cash during the transaction at the POS terminal.

At 220, the automated assistance manager detects an event raised by the POS terminal. The event is correlated with the images during a same or a substantially same period of time during the transaction at the POS terminal.

In an embodiment, at 221, the automated assistance manager receives the event as a last action taken by the operator at the POS terminal before the images were captured.

In an embodiment, at 222, the automated assistance manager receives the event from a scanner that is integrated into the POS terminal.

In an embodiment, at 223, the automated assistance manager receives the event as a failure of an anticipated action that the operator was expected to take at the POS terminal but has not yet taking such anticipated action.

At 230, the automated assistance manager automatically and electronically communicates to the operator a next step (next action) that is to be taken by the operator at the POS terminal based on evaluation of the images and the event. This was discussed above with reference to the FIG. 1.

According to an embodiment, at 231, the automated assistance manager processes predefined rules and analytics for evaluating the images and the event in determining the next step that the operator is to take while at the POS terminal.

In an embodiment, at 232, the automated assistance manager processes one or more of: 1) rendering text instructions to a screen of a display associated with the POS terminal describing the next step to the operator, 2) rendering a video to the screen that plays an animation visually showing how to perform the next step to the operator, and 3) playing audio instructions through speakers of the POS terminal that audibly describes how the operator is to perform the next step while at the POS terminal.

Figure 3:
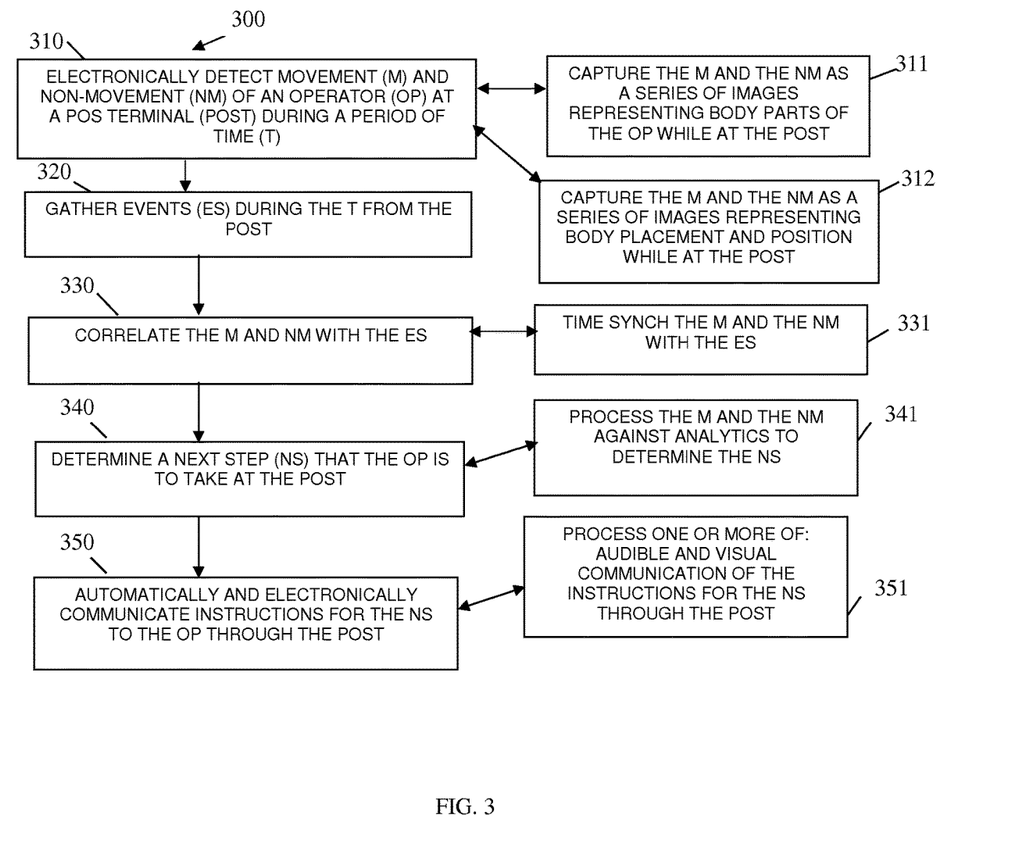
FIG. 3 is a diagram of another method for automated POS terminal assistance, according to an example embodiment.

FIG. 3 is a diagram of another method 300 for automated POS terminal assistance, according to an example embodiment. The software module(s) that implements the method 300 is referred to as a "POS assistance manager." The POS assistance manager is implemented as executable instructions programmed and residing within memory and/or a non-transitory computer-readable (processor-readable) storage medium and executed by one or more hardware processors of a POS terminal. The processors that execute the POS assistance manager are specifically configured and programmed to process the POS assistance manager. The POS assistance manager may or may not have access to one or more networks during its processing. Each network can be wired, wireless, or a combination of wired and wireless.

The POS assistance manager depicts another view and in some ways enhanced processing from that which was described above with respect to the FIG. 2.

In an embodiment, the processing of the POS assistance manager occurs within a scanner.

In an embodiment, at least some of processing for the POS assistance manager occurs within a camera.

In an embodiment, the processing of the POS assistance manager is the image capture module 132, the motion detector/translator 121, and the rules and action manager 123.

In an embodiment, the processing of the POS assistance manager is the image capture module 132, the motion detector/translator 133, and the rules and action manager 123.

In an embodiment, the processing of the POS assistance manager occurs within the POS terminal 110. In an embodiment, the POS terminal 110 is a SST. In an embodiment, the SST is an ATM. In an embodiment, the SST is a kiosk. In an embodiment, the POS terminal 110 is a cashier-assisted terminal.

At 310, the POS assistance manager electronically detects movement and non-movement of an operator at a POS terminal during a predefined period of time.

According to an embodiment, at 311, the POS assistance manager captures the movement and the non-movement of the operator as a series of images representing body parts of the operator while at the POS terminal.

In an embodiment, at 312, the POS assistance manager captures the movement and the non-movement of the operator as a series of images representing body placement and position of the operator while at the POS terminal.

At 320, the POS assistance manager gathers events from the POS terminal (and components of the POS terminal) during the predefined period of time.

At 330, the POS assistance manager correlates the movement and the non-movement of the operator with the gathered events.

According to an embodiment, at 331, the POS assistance manager time synchronizes the movement and the non-movement of the operator with the gathered events.

At 340, the POS assistance manager determines a next step that the operator is to take while at the POS terminal.

In an embodiment, at 341, the POS assistance manager processes the movement and the non-movement of the operator and the gathered events against predefined analytics to determine the next step that the operator is take at the POS terminal.

At 350, the POS assistance manager automatically and electronically communicates instructions for the next step to the operator through the POS terminal.

In an embodiment, at 351, the POS assistance manager processes one or more of: audio and visual communication for the instructions of the next step through the POS terminal.

Figure 4:
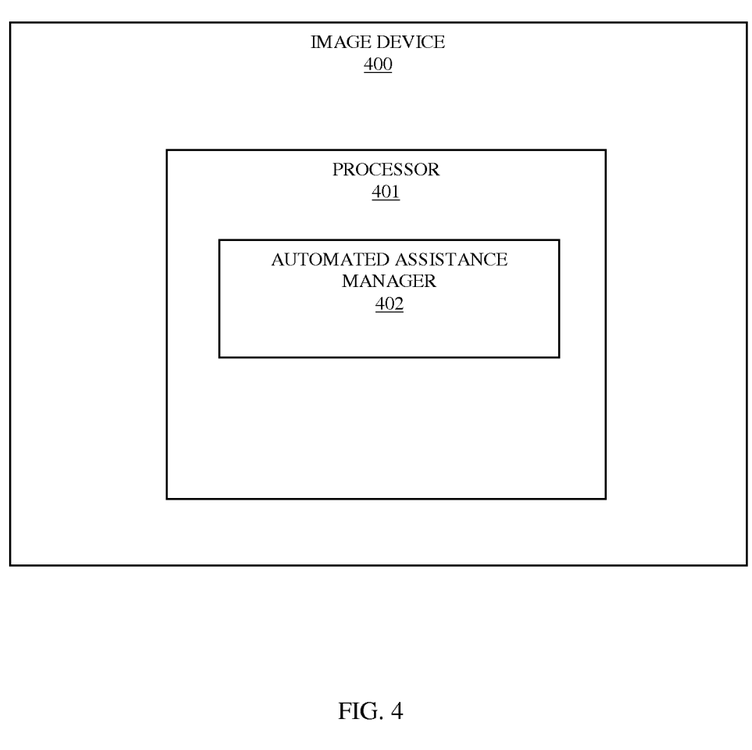
FIG. 4 is a diagram of an imaging device, according to an example embodiment.

FIG. 4 is a diagram of an imaging device 400, according to an example embodiment. Some components of the imaging device 400 are programmed and reside within memory and/or a non-transitory computer-readable medium and execute on one or more processors of the imaging device 400. The imaging device 400 may or may not communicate over one or more networks, which can be wired, wireless, or a combination of wired and wireless.

In an embodiment, the imaging device 400 is a scanner.

In an embodiment, the image device 400 is a camera.

In an embodiment, the image device 400 is a combination scanner and camera.

In an embodiment, the image device 400 is the image device 130 of the FIG. 1.

In an embodiment, the image device 400 is integrated into a POS terminal. In an embodiment the POS terminal is the POS terminal 110 of the FIG. 1. In an embodiment, the POS terminal is a SST. In an embodiment, the SST is an ATM. In an embodiment, the SST is a kiosk. In an embodiment, the POS terminal is a cashier-assisted terminal.

In an embodiment, components of the image device 400 implement the embodiments discussed above with the FIG. 1.

In an embodiment, components of the image device 400 implement the embodiments discussed above with the FIG. 2.

In an embodiment, components of the image device 400 implement the embodiments discussed above with the FIG. 3.

In an embodiment, the components of the image device 400 implement the embodiments discussed above with respect to the FIGS. 1-3.

The image device 400 includes a processor 401, and an automated assistance manager 402.

In an embodiment the image device 400 is a scanner integrated into a POS terminal.

In an embodiment, the image device 400 is a camera integrated or interfaced to a POS terminal.

In an embodiment, the image device is a combination of an integrated scanner and a camera integrated into or interfaced with a POS terminal.

The processor 401 is configured to execute the automated assistance manager 402 from memory and/or a non-transitory computer-readable storage medium of the image device 400. In an embodiment, the processor 401 is a special purpose processor.

The automated assistance manager 402 is adapted and configured to: i) execute on the processor 401, ii) recognize movement and non-movement of an operator of a Point-Of-Sale (POS) terminal from images captured by the imaged capture device over a predefined period of time, iii) collect events raised from the POS terminal with the movement and the non-movement, and iv) cause instructions to be communicated through the POS terminal for a next step to be taken by the operator based on evaluation of the movement, the non-movement, and the events.

In an embodiment, the image device 400 is a scanner integrated into the POS terminal, the POS terminal is a Self-Service Terminal (SST), and the operator is a customer operating the SST during a self-service checkout transaction.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
capturing, by a scanner integrated into a Point-Of-Sale (POS) terminal, images of: 1) movement and non-movement of an operator of the POS terminal; and movement and placement of items being handled during an ongoing transaction by the operator at the POS terminal;
obtaining, by executable instructions that execute on a processor of the scanner from a non-transitory computer-readable storage medium, an event raised from the POS terminal and associating the event, during the ongoing transaction, with one or more of: a state of the ongoing transaction, a selection of an option made by the operator, repeated selections of a particular option made by the operator, a lack of any selection being received from the operator within a configured elapsed period of time, and a failure to detect an expected next action from the operator, and wherein the expected next action selected from: an item expected to be placed in a bagging carrousel, the item expected to be scanned by the scanner, the item expected to be placed on an integrated weigh scale of the POS terminal, and an expected selection of an item type for the item when the item is placed on the integrated weigh scale; and
automatically and electronically, by the executable instructions, communicating to the operator a next step to be performed by the operator on the POS terminal for advancing the ongoing transaction based on evaluating the images and the event using rules that map to actions, and wherein automatically and electronically further includes providing the next step as text data and audio data that is matched by the rules as a particular one of the actions, and instructing the POS terminal to display the text data and play the audio data over a speaker of the POS terminal to the operator.

2. The method of claim 1, wherein capturing further includes capturing the images as hand movements of the operator within a field of view of the scanner that is integrated into the POS terminal.

3. The method of claim 1, wherein capturing further includes capturing the images over a predefined period of time.

4. The method of claim 3, wherein capturing further includes detecting the images as movement of the operator with respect to components of the POS terminal.

5. The method of claim 3, wherein capturing further includes detecting the images as non-movement of the operator with respect to components of the POS terminal.

6. The method of claim 3, wherein capturing further includes detecting the images as movement or non-movement of the operator with respect to the item that the operator is handling while at the POS terminal.

7. The method of claim 6, wherein detecting further includes identifying the item as one of: a good being purchased, a coupon being redeemed, and a check being cashed.

8. The method of claim 1, wherein obtaining further includes receiving the event as a last action taken by the operator on the POS terminal.

9. The method of claim 1, wherein obtaining further includes receiving the event as a failure of an anticipated action that the operator was expected to take at the POS terminal.

10. The method of claim 1, wherein automatically and electronically communicating further includes processing predefined rules and analytics for evaluating the images and event in determining the next step.

11. The method of claim 1, wherein automatically and electronically communicating further includes one or more of: rendering the text data to a screen of a display on the POS terminal describing the next step to the operator, rendering a video to the screen that plays an animation showing the next step to the operator, playing the audio data through the speakers of the POS terminal and audibly communicating the next step to the operator.

12. A method, comprising:
electronically detecting, by executable instructions that execute on a processor of a scanner from a non-transitory computer-readable storage medium, movement and non-movement of an operator at a Point-Of-Sale (POS) terminal during a period of time and during an ongoing transaction by the operator at the POS terminal, and detecting movement and placement of items during the ongoing transactions, wherein the scanner is integrated into the POS terminal;
gathering, by the executable instructions, events during the period of time from the POS terminal and associating the events with the ongoing transaction, wherein gathering further includes obtaining the events as one or more of: a state of the ongoing transaction, a selection of an option made by the operator, repeated selections of a particular option made by the operator, a lack of any selection being received from the operator within a configured elapsed period of time, and a failure to detect an expected next action from the operator, and wherein the expected next action selected from: an item expected to be placed in a bagging carrousel, the item expected to be scanned by the scanner, the item expected to be placed on an integrated weigh scale of the POS terminal, and an expected selection of an item type for the item when the item is placed on the integrated weigh scale;
correlating, by the executable instructions, the movement of the operator, the non-movement of the operator, the movement of the items, and the placement of the items with the events based on a substantially same period of time associated with the events being gathered and detection of each of: the movement of the operator, the non-movement of the operator, the movement of the items, and the placement of the items;
determining, by the executable instructions, a next step that the operator is to take at the POS terminal for advancing the ongoing transaction by evaluating rules that map to actions and matching a particular rule to a particular mapped action that represents the next step; and
automatically and electronically communicating, by the executable instructions, the next step to the operator through the POS terminal for advancing the ongoing transaction by the operator at the POS terminal, wherein automatically and electronically communicating further includes providing the next step as text data to display on the POS terminal to the operator and audio data to play over speakers of the POS terminal.

13. The method of claim 12, wherein electronically detecting further includes capturing the movement and the non-movement of the operator as a series of images representing body parts of the operator while at the POS terminal.

14. The method of claim 12, wherein electronically detecting further includes capturing the movement and the non-movement of the operator as a series of images representing body placement and position while at the POS terminal.

15. The method of claim 12, wherein correlating further includes time synching the movements and the non-movements with the events.

16. The method of claim 12, wherein determining further includes processing the movements and the non-movements of the operator against analytics to determine the next step.

17. An image device, comprising:
an image capture device that is a scanner integrated into a Point-Of-Sale (POS) terminal;
a processor;
a non-transitory computer-readable storage medium;
executable instructions residing in the non-transitory computer-readable storage medium representing an automated assistance manager; and
the automated assistance manager adapted and configured to: i) execute on the processor, ii) recognize movement and non-movement of an operator engaged in an ongoing transaction on the POS terminal from images captured by the imaged capture device over a predefined period of time, and recognize movement and placement of items being processed at the POS terminal during the ongoing transaction within the images, iii) collect events raised from the POS terminal with the movement and the non-movement of the operator, and with the movement and placement of the items, and associating the events with the ongoing transaction as one or more of: a state of the ongoing transaction, a selection of an option made by the operator, repeated selections of a particular option made by the operator, a lack of any selection being received from the operator within a configured elapsed period of time, and a failure to detect an expected next action from the operator, and wherein the expected next action selected from: an item expected to be placed in a bagging carrousel, the item expected to be scanned by the scanner, the item expected to be placed on an integrated weigh scale of the POS terminal, and an expected selection of an item type for the item when the item is placed on the integrated weigh scale and iv) cause instructions to be communicated to the POS terminal for a next step to be taken by the operator to advance the ongoing transaction based on evaluation of rules based on: the movement of the operator, the non-movement of the operator, the movement of the items, the placement of the items, and the events, and wherein based on evaluation of the rules mapping a particular rule to an action, wherein the action is the next step, and wherein the action is communicated to the POS terminal as text data to display on the POS terminal for the next step, and the action is communicated to the POS terminal as audio data to play over speakers of the POS terminal for the next step.

18. The image device of claim 17, wherein the POS terminal is a Self-Service Terminal (SST), and the operator is a customer operating the SST during a self-service checkout transaction that is the transaction.

* * * * *